(12) United States Patent
Onishi et al.

(10) Patent No.: US 11,361,482 B2
(45) Date of Patent: Jun. 14, 2022

(54) TRIANGLE ELEMENT DIVISION METHOD, MODELING APPARATUS, COMPUTER READABLE MEDIUM STORING PROGRAM, AND DATA DEFINING TWO-DIMENSIONAL PLANAR FIGURE

(71) Applicant: SUMITOMO HEAVY INDUSTRIES, LTD., Tokyo (JP)

(72) Inventors: Yoshitaka Onishi, Kanagawa (JP); Ryota Hirose, Kanagawa (JP); Nariaki Matsumiya, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/078,880

(22) Filed: Oct. 23, 2020

(65) Prior Publication Data
US 2021/0125385 A1 Apr. 29, 2021

(30) Foreign Application Priority Data
Oct. 25, 2019 (JP) .............................. JP2019-194482

(51) Int. Cl.
 *G06T 11/20* (2006.01)
 *G06T 11/60* (2006.01)
(52) U.S. Cl.
 CPC .......... *G06T 11/203* (2013.01); *G06T 11/206* (2013.01); *G06T 11/60* (2013.01)
(58) Field of Classification Search
 CPC ........ G06T 11/00; G06T 11/20; G06T 11/203; G06T 11/206; G06T 11/40; G06T 11/60
(Continued)

(56) References Cited

U.S. PATENT DOCUMENTS

| | | | | |
|---|---|---|---|---|
| 6,847,359 | B1* | 1/2005 | Ono | ........................ G06T 17/10 345/419 |
| 2002/0005856 | A1* | 1/2002 | Sasaki | ..................... G06T 11/20 345/606 |

(Continued)

OTHER PUBLICATIONS

Marshall Bern et al., "Mesh Generation and Optimal Triangulation", Lectures Notes Series on Computing, Computing in Euclidean Geometry ($2^{nd}$ Edition), Jan. 25, 1995, pp. 47-123, vol. 4, DOI: 10.1142/9789812831699_0003, World Scientific Publishing Co. Pte. Ltd.

(Continued)

*Primary Examiner* — Yingchun He
(74) *Attorney, Agent, or Firm* — Michael Best & Friedrich LLP

(57) ABSTRACT

A triangle element division method includes acquiring position information of a plurality of feature points positioned on a border of a two-dimensional planar figure, segmenting a virtual plane including the two-dimensional planar figure into a plurality of quadrangular cells, disposing additional points at positions where edges as line segments connecting two adjacent feature points on the border of the two-dimensional planar figure and borders of the plurality of cells cross, and vertices of the plurality of cells, for each of the plurality of cells, generating a plurality of triangle elements with the feature points and the additional points in the cell as vertices such that conditions that a region in the cell is filled with a plurality of the triangle elements and the triangle elements do not overlap each other are satisfied, and removing the triangle elements positioned outside the two-dimensional planar figure.

13 Claims, 15 Drawing Sheets

(58) Field of Classification Search
USPC .......................................................... 345/442
See application file for complete search history.

(56) References Cited

U.S. PATENT DOCUMENTS

| | | | | |
|---|---|---|---|---|
| 2007/0206027 | A1* | 9/2007 | Chen | G06T 15/30 345/620 |
| 2009/0244063 | A1* | 10/2009 | Dohta | G06T 17/20 345/420 |
| 2016/0125577 | A1* | 5/2016 | Wu | G06T 17/00 382/195 |
| 2016/0163090 | A1* | 6/2016 | Chang | G06T 17/20 345/419 |

OTHER PUBLICATIONS

Hossam Elgindy et al., "Slicing an ear using prune-and-search". Pattern Recognition Letter, vol. 14, Issue 9, Sep. 1993, pp. 719-722, doi.org/10.1016/0167-8655(93)90141-Y, Elsevier Science Publishers B.V.

* cited by examiner

TRIANGLE ELEMENT DIVISION METHOD, MODELING APPARATUS, COMPUTER READABLE MEDIUM STORING PROGRAM, AND DATA DEFINING TWO-DIMENSIONAL PLANAR FIGURE

RELATED APPLICATIONS

The content of Japanese Patent Application No. 2019-194482, on the basis of which priority benefits are claimed in an accompanying application data sheet, is in its entirety incorporated herein by reference.

BACKGROUND

Technical Field

Certain embodiments of the present invention relate to a triangle element division method, a modeling apparatus, a computer readable medium storing a program, and data defining two-dimensional planar figure.

Description of Related Art

A method of dividing a two-dimensional planar figure, of which the shape is defined by two-dimensional point group data, into a plurality of triangle elements has been studied since long ago as a method of dividing a polygon into a plurality of triangles. In recent years, with development of three-dimensional measuring instrument, there is an increasing demand for triangulating (polygonizing) a shape of a measurement target object defined by point group data obtained by measurement and storing the shape of the measurement target object in a computer.

A method of dividing a two-dimensional planar figure into a plurality of triangle elements has been described in the related art. In a method of the related art, all points are connected by line segments, and overlapping line segments are removed. In an ear slicing method of the related art, a triangle element (ear) where two sides are sides of a polygon and remaining one side is positioned inside the polygon is sliced. Another method of the related art is a method of uniquely deciding a convex polyhedron including a point group, and positively creates an element close to an equilateral triangle.

SUMMARY

According to an embodiment of the invention, there is provided a triangle element division method including:

acquiring position information of a plurality of feature points positioned on a border of a two-dimensional planar figure;

segmenting a virtual plane including the two-dimensional planar figure into a plurality of quadrangular cells;

disposing additional points at positions where edges as line segments connecting two adjacent feature points on the border of the two-dimensional planar figure and borders of the plurality of cells cross, and vertices of the plurality of cells;

for each of the plurality of cells, generating a plurality of triangle elements with the feature points and the additional points in the cell as vertices such that conditions that a region in the cell is filled with a plurality of the triangle elements and the triangle elements do not overlap each other are satisfied; and removing the triangle elements positioned outside the two-dimensional planar figure.

According to another embodiment of the invention, there is provided a modeling apparatus including:

an input unit that acquires position information of a plurality of feature points positioned on a border of a two-dimensional planar figure;

a processing unit that divides the two-dimensional planar figure, which is defined by the position information input to the input unit, into a plurality of triangle elements; and an output unit that outputs a processing result of the processing unit, in which the processing unit is configured to execute processing of segmenting a virtual plane including the two-dimensional planar figure into a plurality of quadrangular cells, processing of disposing additional points at positions where edges as line segments connecting two adjacent feature points on the border of the two-dimensional planar figure and borders of the plurality of cells cross, and vertices of the plurality of cells, processing of, for each of the plurality of cells, generating a plurality of triangle elements with the feature points and the additional points in the cell as vertices such that conditions that a region in the cell is filled with a plurality of the triangle elements and the triangle elements do not overlap each other are satisfied, processing of removing the triangle elements positioned outside the two-dimensional planar figure, and processing of outputting, to the output unit, information defining a plurality of the triangle elements remaining after the processing of removing the triangle elements positioned outside the two-dimensional planar figure.

According to still another aspect of the invention, there is provided data defining a two-dimensional planar figure divided into a plurality of triangle elements, in which an inside of the two-dimensional planar figure is segmented into a plurality of cells by a plurality of straight lines parallel in a first direction and a plurality of straight lines parallel in a second direction crossing the first direction, and each cell included in the two-dimensional planar figure among the plurality of cells is divided into two triangle elements by one diagonal line.

According to still another aspect of the invention, there is provided a computer readable medium storing a program that causes a computer to execute:

a function of acquiring position information of a plurality of feature points positioned on a border of a two-dimensional planar figure;

a function of segmenting a virtual plane including the two-dimensional planar figure into a plurality of quadrangular cells;

a function of disposing additional points at positions where edges as line segments connecting two adjacent feature points on the border of the two-dimensional planar figure and borders of the plurality of cells cross, and vertices of the plurality of cells;

a function of, for each of the plurality of cells, generating a plurality of triangle elements with the feature points and the additional points in the cell as vertices such that conditions that a region in the cell is filled with a plurality of the triangle elements and the triangle elements do not overlap each other are satisfied; and a function of removing the triangle elements positioned outside the two-dimensional planar figure.

DETAILED DESCRIPTION

The method of the related art is a very simple method, but in a case where the number of points included in the point group increases, a computation time becomes enormous. The ear slicing method of the related art cannot be used in a case where a hole exists inside the polygon. That is, a target figure to be handled is limited, and robustness is low. Another method of the related art requires a lot of computation time.

It is desirable to provide a triangle element division method with high robustness without needing an enormous computation time.

Since each cell is divided into the triangle elements, the number of point groups for generating the triangle elements decreases. As a result, it is possible to suppress extension of a computation time. In addition, the triangle elements generated outside the two-dimensional planar figure are removed, whereby triangle element division can be performed even on a two-dimensional planar figure having a hole inside, and a triangle element division method with high robustness is provided.

A triangle element division method and a modeling apparatus according to an embodiment will be described referring to FIGS. 1 to 11.

Figure 1:
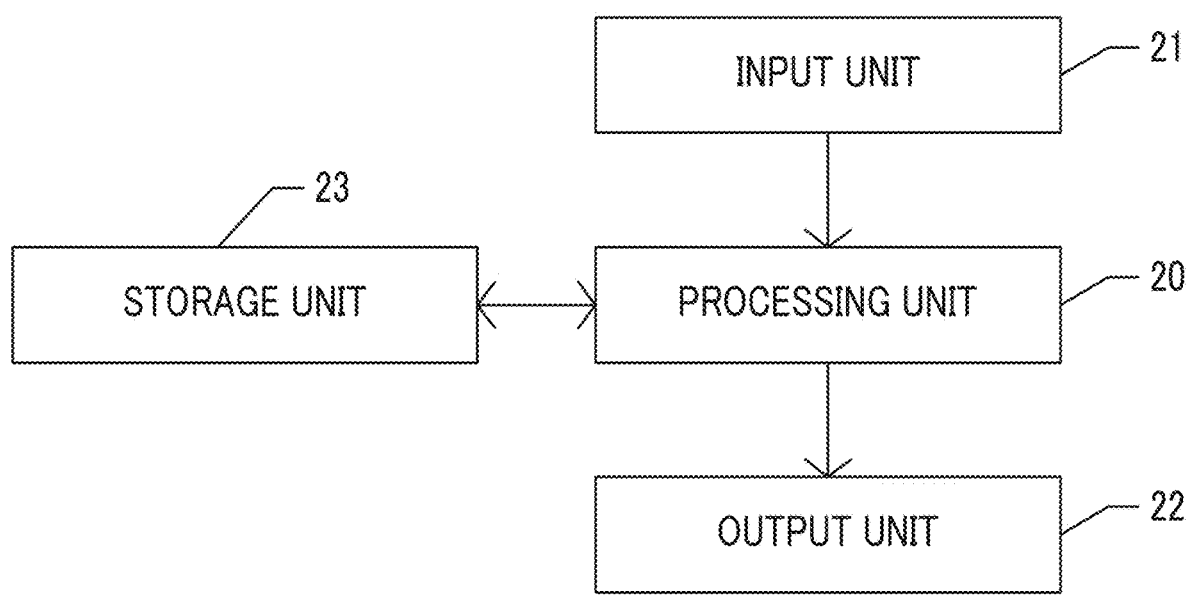
FIG. 1 is a block diagram of a modeling apparatus according to an embodiment.

FIG. 1 is a block diagram of the modeling apparatus according to the embodiment. The modeling apparatus according to the embodiment includes a processing unit 20, an input unit 21, an output unit 22, and a storage unit 23.

An input of various commands to the modeling apparatus and an input of data defining a shape of a two-dimensional planar figure to be subject to triangle element division, or the like are performed to the input unit 21. The input unit 21 includes, for example, a keyboard, a touch panel, a pointing device, a removable medium reading device, a communication device, and the like.

The processing unit 20 executes various kinds of processing according to commands input to the input unit 21. For example, the processing unit 20 divides the two-dimensional planar figure into a plurality of triangle elements based on data defining the shape of the two-dimensional planar figure input to the input unit 21. The processing unit 20 outputs a processing result to the output unit 22. The processing unit 20 is constituted of, for example, a central processing unit (CPU) or the like of a computer.

The storage unit 23 includes a main storage device and an auxiliary storage device. An operating system (OS) for the operation of the processing unit 20, programs that are executed by the processing unit 20, and the like are stored in the auxiliary storage device. The processing unit 20 reads the program stored in the auxiliary storage device to the main storage device and executes the program stored in the main storage device. The processing unit 20 temporarily stores various kinds of data necessary for the processing of the processing unit 20 in the main storage device. As the auxiliary storage device, for example, a hard disk drive, a flash memory, or the like is used. As the main storage device, for example, a random access memory (RAM) is used.

The output unit 22 includes, for example, a display, a removable medium writing device, a communication device, and the like. The display displays the processing result of the processing unit 20 as an image. The removable medium writing device writes the processing result of the processing unit 20 to a removable medium. The communication device transmits the processing result of the processing unit 20 to external equipment.

Figure 2:
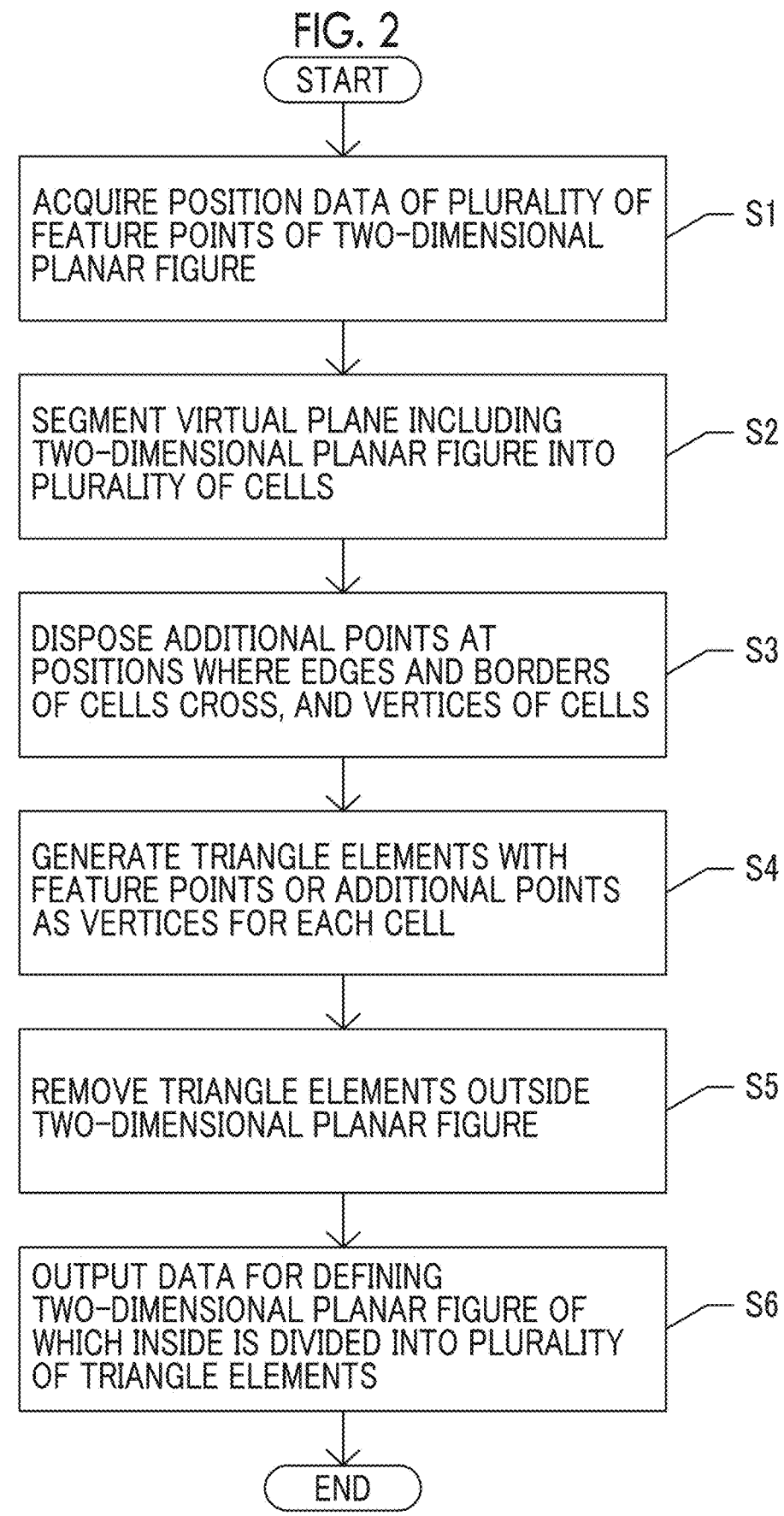
FIG. 2 is a flowchart of a triangle element division method according to the embodiment.

FIG. 2 is a flowchart of the triangle element division method according to the embodiment. A function of each step of the flowchart shown in FIG. 2 is realized by the processing unit 20 (FIG. 1) executing the program stored in the storage unit 23. In each step of the flowchart of FIG. 2, processing that is executed on the two-dimensional planar figure is executed by executing data processing on position data defining a position of each point of a point group defining the shape of the two-dimensional planar figure.

First, in Step S1, the processing unit 20 (FIG. 1) acquires position information of a plurality of feature points of the two-dimensional planar figure input to the input unit 21 (FIG. 1). The position information includes, for example, values of an x coordinate and a y coordinate on xy coordinates.

Figure 3:
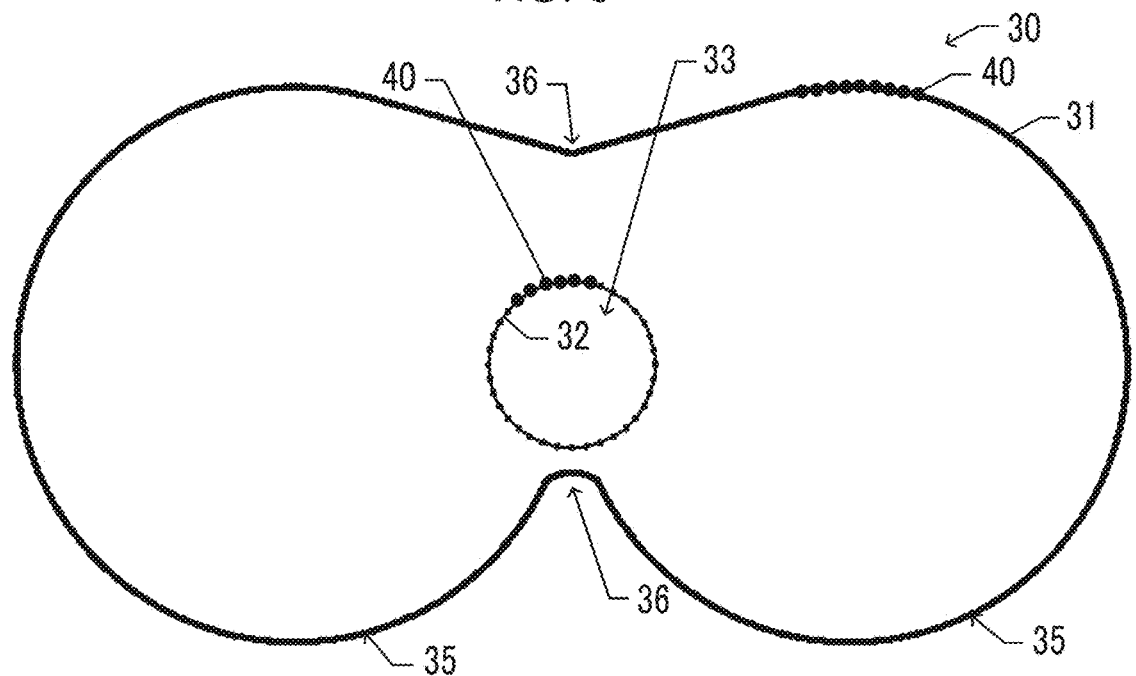
FIG. 3 is a diagram showing an example of a two-dimensional planar figure.

FIG. 3 shows an example of a two-dimensional planar figure 30. An outer shape of the two-dimensional planar figure 30 is demarcated by a border 31. A hole 33 is provided inside a region surrounded by the border 31. A periphery of the hole 33 is demarcated by a border 32. A region between the outer border 31 and the inner border 32 is the inside of the two-dimensional planar figure 30. A region outside the outer border 31 and a region inside the hole 33 are the outside of the two-dimensional planar figure 30. The outer border 31 includes a portion 35 convex outward and a portion 36 convex inward. A plurality of feature points 40 are defined on the outer border 31 and the inner border 32. A serial number is given to a plurality of feature points 40, and one feature point 40 is specified by the serial number. Positions of a plurality of feature points 40 are defined by position information, and the shape of the two-dimensional planar figure is defined by the positions of a plurality of feature points 40. In FIG. 3, only a part of feature points 40 is shown.

Figure 4:
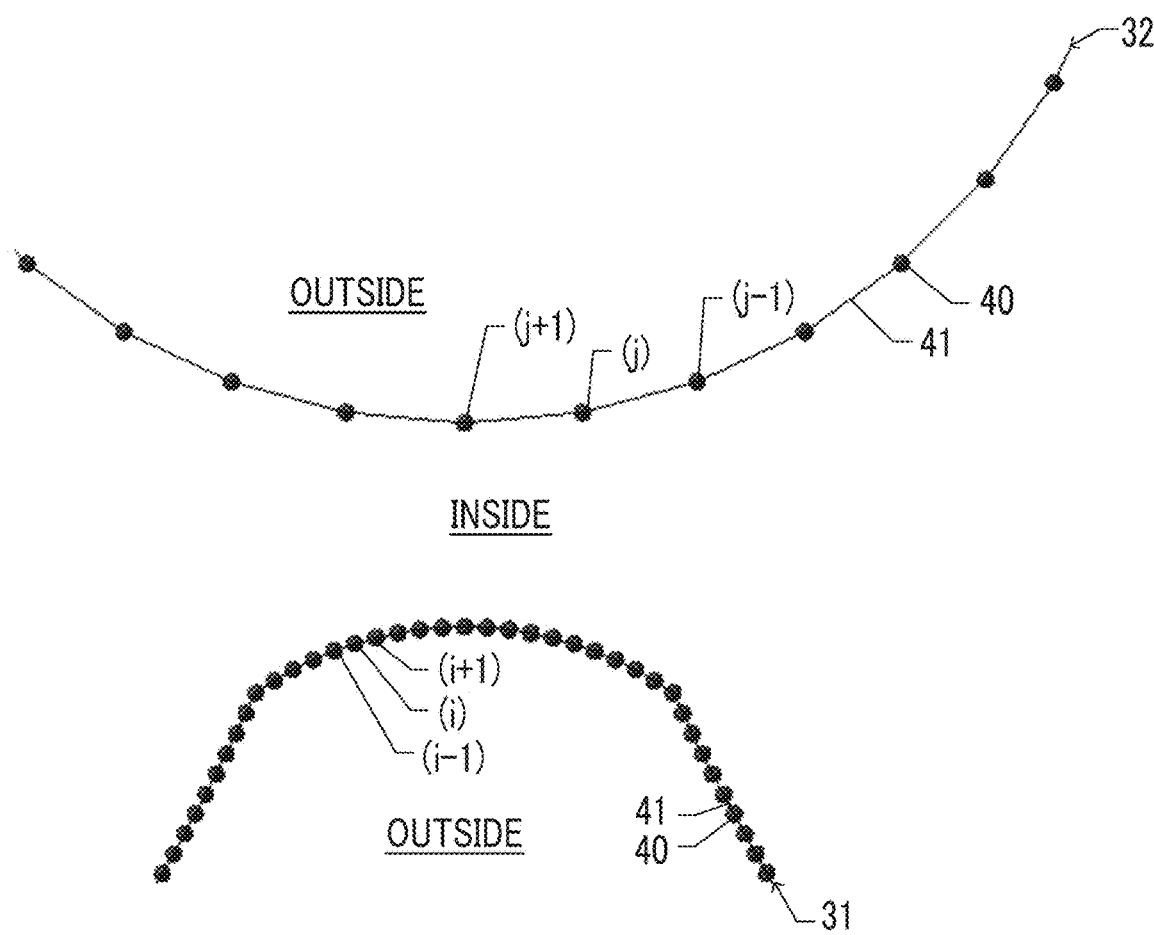
FIG. 4 is an enlarged view of a part of feature points disposed on an outer border and an inner border of the two-dimensional planar figure.

FIG. 4 is an enlarged view of a part of the feature points 40 disposed on the outer border 31 and the inner border 32. Serial numbers i−1, i, and i+1 are given to three feature points 40 disposed on the outer border 31, and serial numbers j−1, j, and j+1 are given to three feature point 40 disposed on the inner border 32. Here, i and j are integers. When the feature point 40 of a greater number is viewed from the feature point 40 of a smaller number, left and right regions are defined as the inside and the outside of the two-dimensional planar figure 30, respectively. The definition of the inside and the outside may be reversed. The inside and the outside may be defined using other methods. A line segment with two feature points 40 of continuous serial numbers as both ends is referred to as an edge 41.

After Step S1, in Step S2 (FIG. 2), a finite virtual plane including the two-dimensional planar figure 30 is defined, and the virtual plane is segmented into a plurality of cells.

Figure 5:
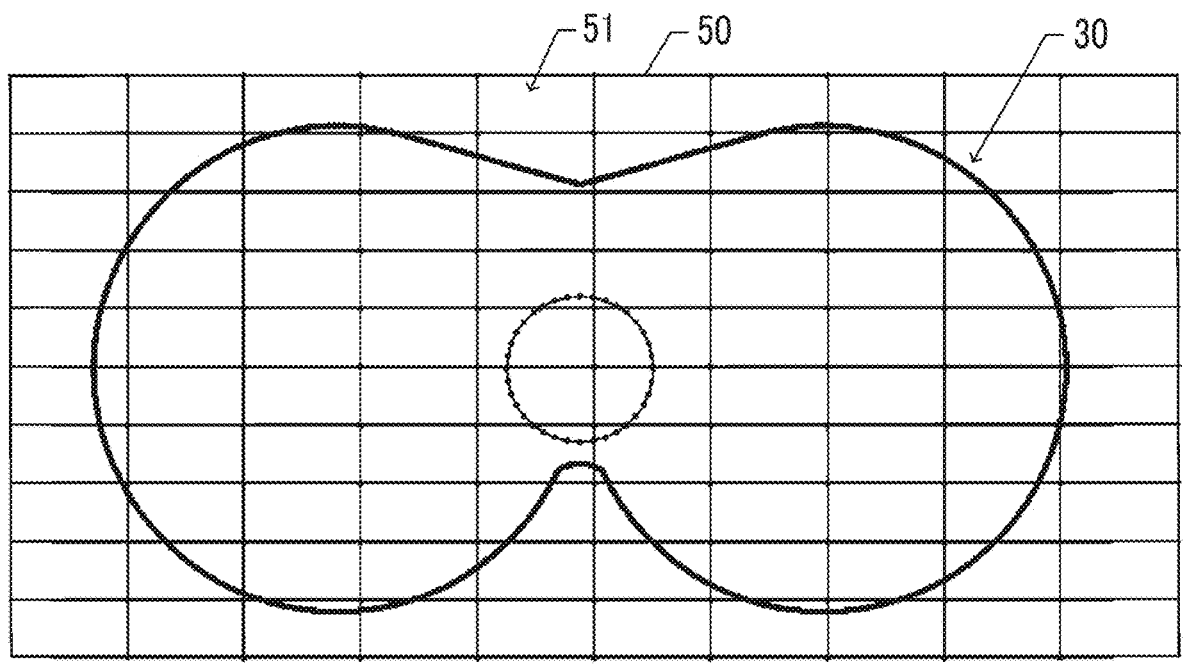
FIG. 5 is a diagram of a virtual plane segmented into a plurality of cells.

FIG. 5 is a diagram of a virtual plane 50 segmented into a plurality of cells 51. The two-dimensional planar figure 30 is included in the virtual plane 50. The virtual plane 50 is separated by a plurality of straight lines parallel in a first direction D1 (in FIG. 5, a right-left direction) and a plurality of straight lines parallel in a second direction D2 (in FIG. 5, an up-down direction) perpendicular to the first direction D1 and is segmented into a plurality of cells 51. Each of a plurality of cells 51 is, for example, a rectangle.

Next, in Step S3 (FIG. 2), additional points 42 are disposed at positions where the edges 41 and the borders of the cells 51 cross, and vertices of the cells 51.

Figure 6:
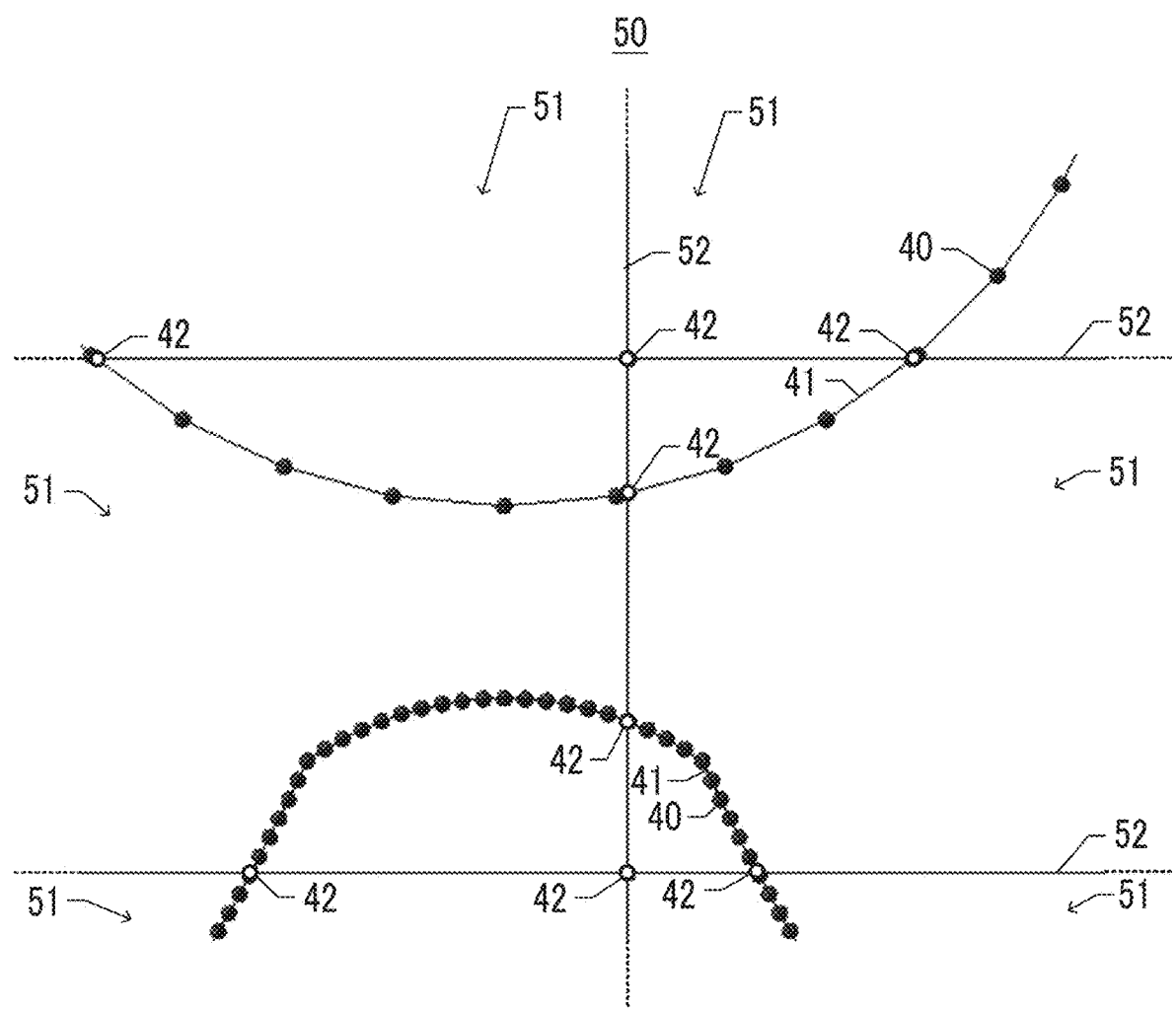
FIG. 6 is a diagram showing a part of the virtual planes in a state in which additional points are disposed.

FIG. 6 shows a part of the virtual plane 50 in a state in which the additional points 42 are disposed. The additional points 42 are disposed at the positions where the borders 52 of the cells 51 and the edges 41 cross. The additional points 42 are also disposed at the vertices of the cells 51. In a case where a situation occurs in which the border 52 of the cell 51 passes through the feature point 40, the virtual plane 50 and the two-dimensional planar figure 30 are relatively slightly shifted, thereby avoiding the occurrence of a situation in which the border 52 of the cell 51 passes through the feature point 40.

Next, in Step S4 (FIG. 2), a plurality of triangle elements with the feature points 40 and the additional points 42 as vertices are generated for each cell 51. In this case, the triangle elements are generated such that two conditions that the cell 51 is completely filled with a plurality of triangle elements and the triangle elements do not overlap each other are satisfied. Generating the triangle elements so as to satisfy the two conditions is referred to as generating the triangle elements without excess and deficiency.

Figure 7:
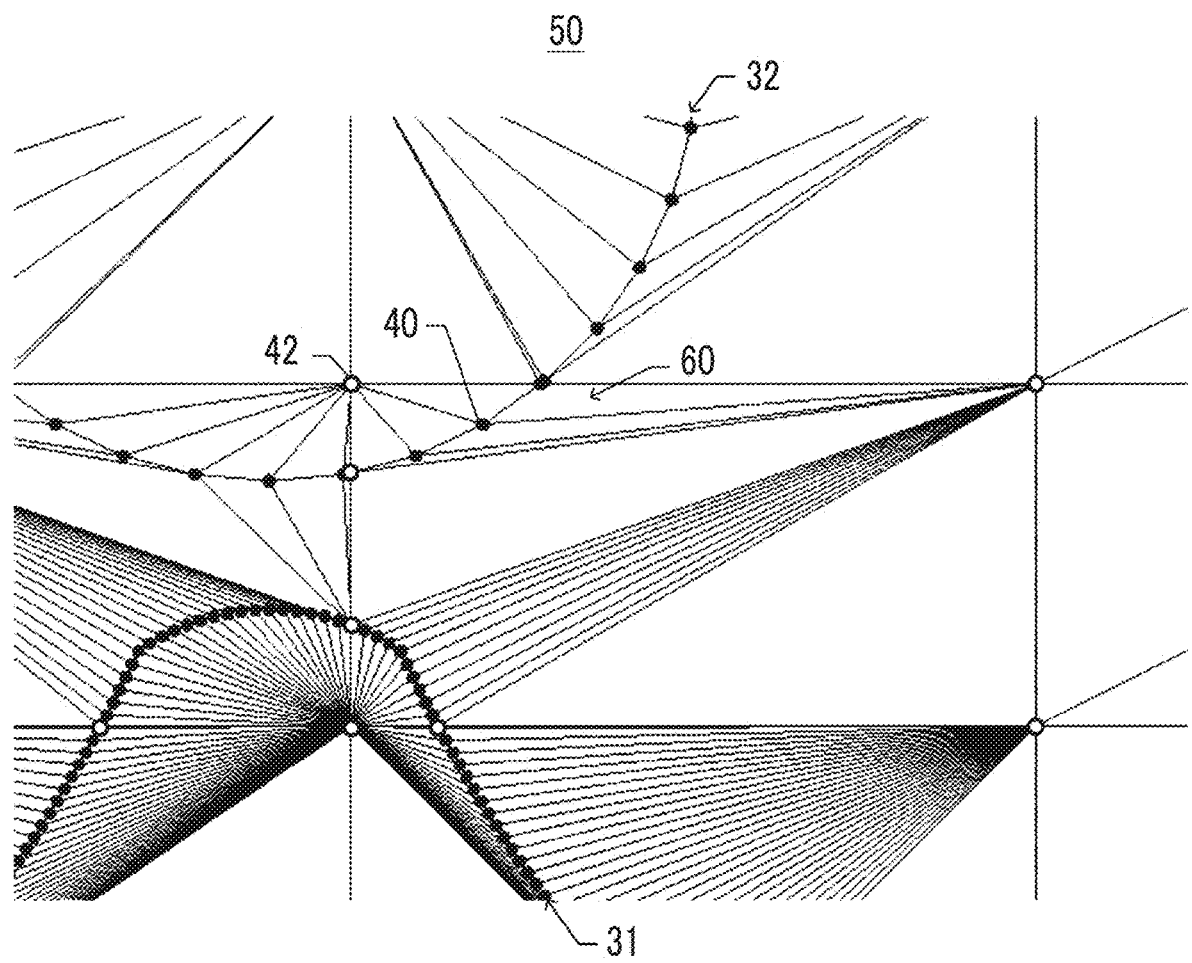
FIG. 7 is a diagram of the virtual plane in which triangle elements are generated.

FIG. 7 shows a part of the virtual plane 50 in which the triangle elements 60 are generated. Hereinafter, a procedure for generating a plurality of triangle elements 60 will be described. First, line segments that connect all feature points 40 in one cell 51 and all additional points 42 positioned on the border 52 of the cell 51 are generated. Two line segments crossing each other among the line segments are detected, and one of the two line segments is deleted. The procedure is repeated until the line segments crossing each other are eliminated. With this, the triangle elements 60 are generated in the cell 51 without excess and deficiency. When a plurality of line segments are generated in order, in a case where a line segment to be newly generated will cross an already generated line segment, generation of a new line segment may not be performed.

Next, in Step S5 (FIG. 2), the triangle elements 60 outside the two-dimensional planar figure 30 are removed. A specific procedure of Step S5 will be described referring to FIGS. 8 to 11.

Figure 8:
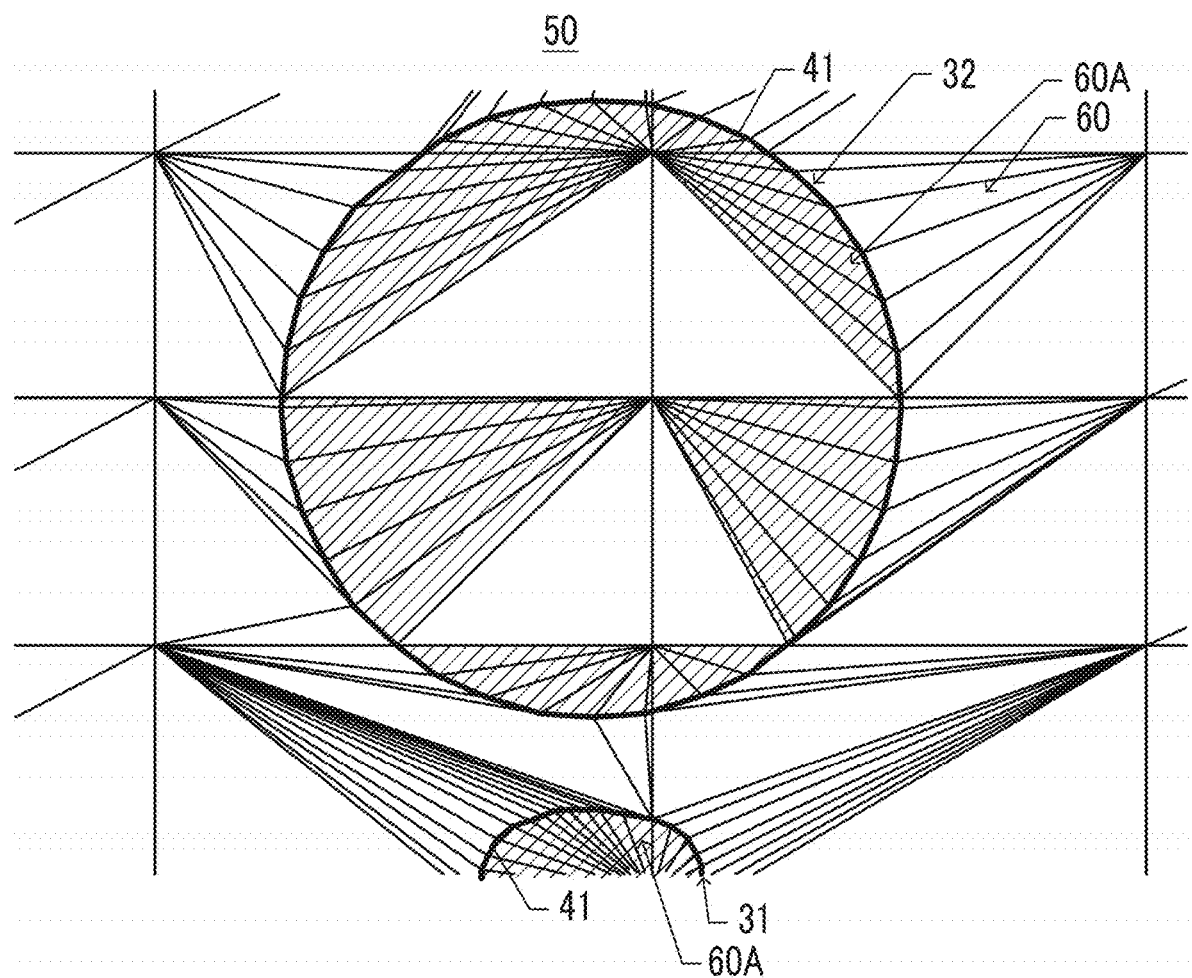
FIG. 8 is a diagram showing the virtual plane in a state before the triangle elements are removed in Step S5 (FIG. 2).

FIG. 8 is a diagram showing the virtual plane 50 in a state before the triangle elements 60 are removed in Step S5. In this stage, the triangle elements 60 are generated on both sides of each of all edges 41. Since the edge 41 corresponds to the border of the two-dimensional planar figure 30, one of the triangle elements 60 on both sides of the edge 41 is positioned inside the two-dimensional planar figure 30, and the other triangle element 60 is positioned outside the two-dimensional planar figure 30. First, for each of all edges 41, a triangle element 60A that includes the edge 41 and is positioned outside the two-dimensional planar figure 30 is removed. In FIG. 8, the triangle element 60A that includes the edge 41 and is positioned outside the two-dimensional planar figure 30 is hatched.

Figure 9:
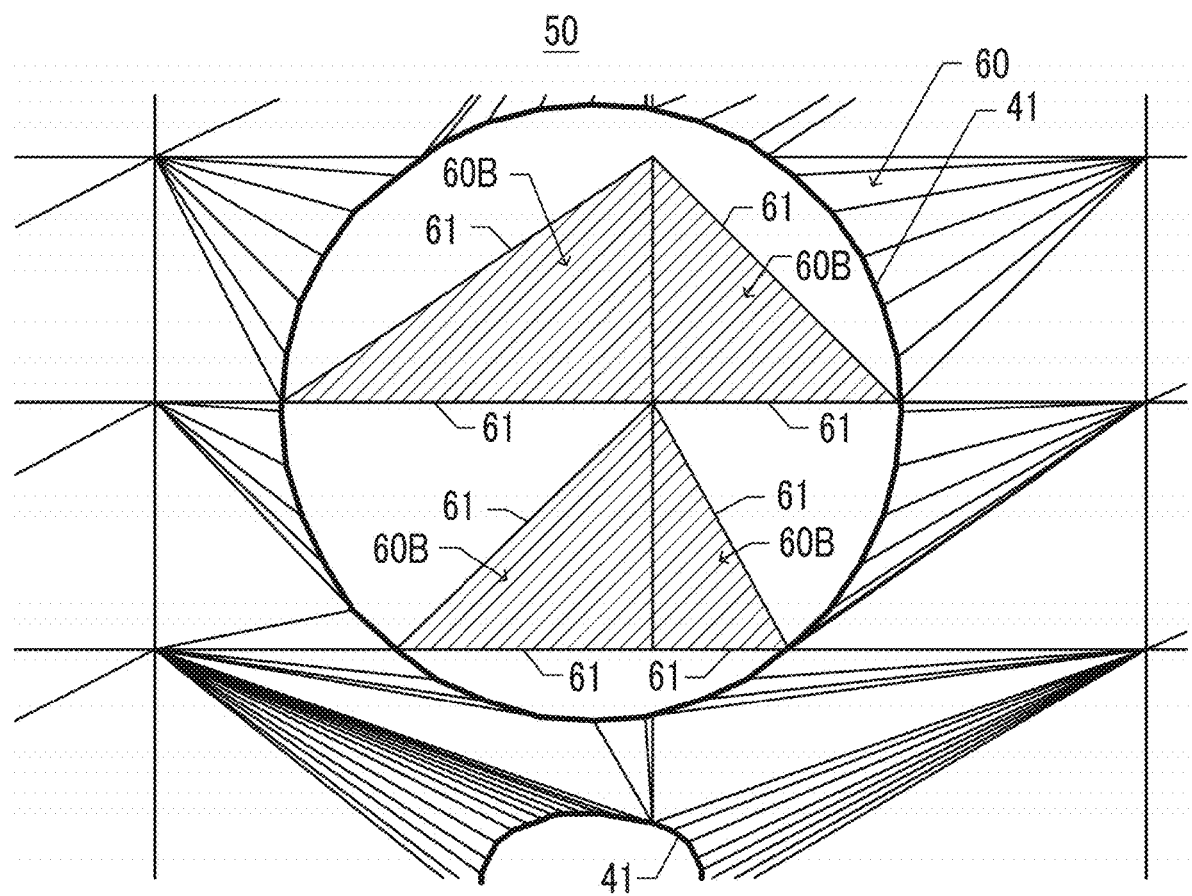
FIG. 9 is a diagram showing the virtual plane in a state in which triangle elements that include edges and are positioned outside the two-dimensional planar figure are removed.

FIG. 9 is a diagram showing the virtual plane 50 in a state in which the triangle element 60A (FIG. 8) that includes the edge 41 and is positioned outside the two-dimensional planar figure 30 is removed. In this stage, triangle elements 60B that are positioned outside the two-dimensional planar figure 30 and do not include the edge 41 remain unremoved. In FIG. 9, the triangle elements 60B are hatched.

The triangle elements 60 that are positioned inside the two-dimensional planar figure 30 abut on adjacent triangle elements 60 through sides other than the edge 41. That is, the triangle elements 60 are disposed on both sides of the sides of the triangle elements 60 other than the edge 41. Accordingly, in extracting the triangle elements 60B positioned outside the two-dimensional planar figure 30, first, sides, only one side of which has the triangle element 60, should be extracted from among the sides other than the edge 41. In FIG. 9, as the sides, only one side of which has the triangle element 60, sides 61 are extracted. Four triangle elements 60B including the sides 61 are determined to be positioned outside the two-dimensional planar figure 30.

Figure 10:
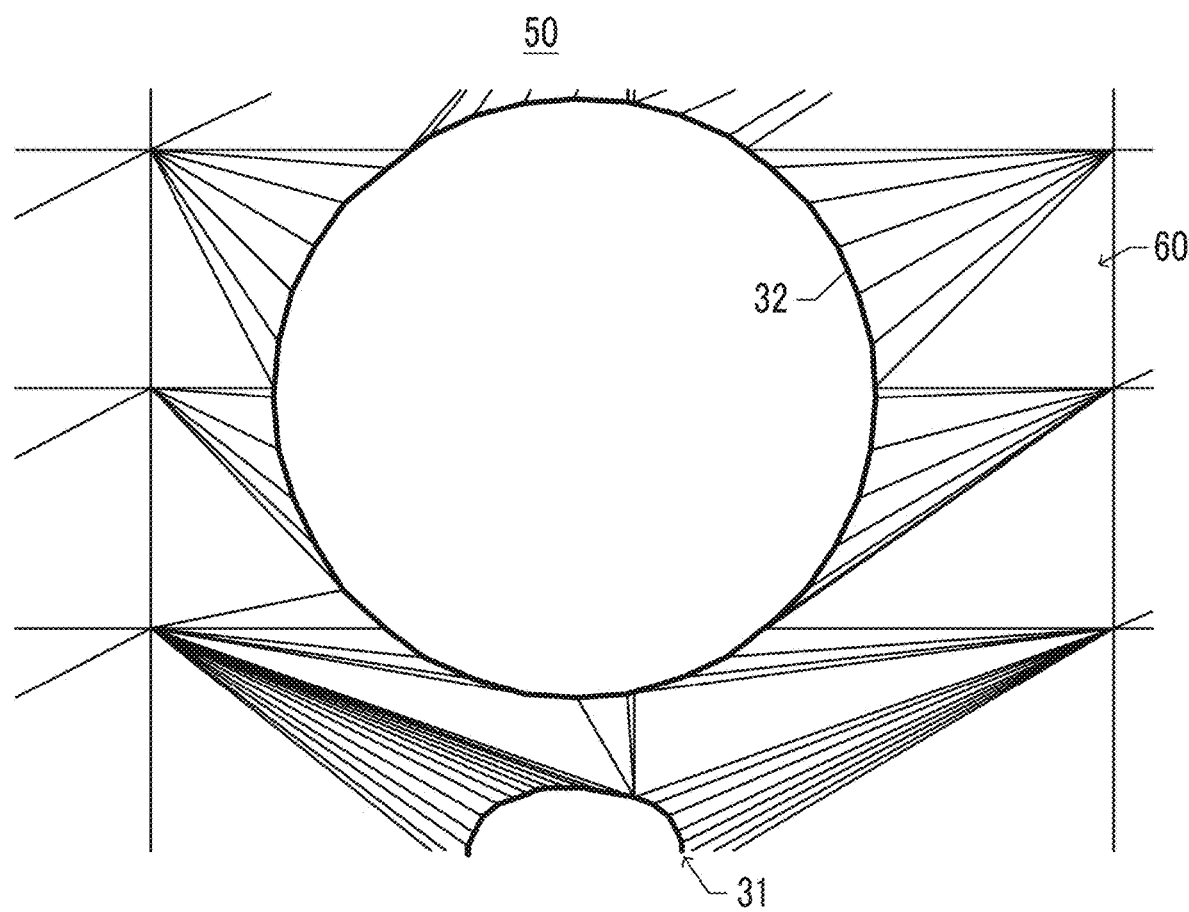
FIG. 10 is a diagram showing the virtual plane in a state in which triangle elements are removed.

FIG. 10 is a diagram showing the virtual plane 50 in a state in which the triangle elements 60B (FIG. 9) are removed. The triangle elements 60A (FIG. 8) and the triangle elements 60B (FIG. 9) positioned outside the two-dimensional planar figure 30 are removed, and the triangle elements 60 remain only inside the two-dimensional planar figure 30.

Next, in Step S6 (FIG. 2), the processing unit 20 outputs data defining the two-dimensional planar figure 30, of which the inside is divided into a plurality of triangle elements 60, to the output unit 22.

Figure 11:
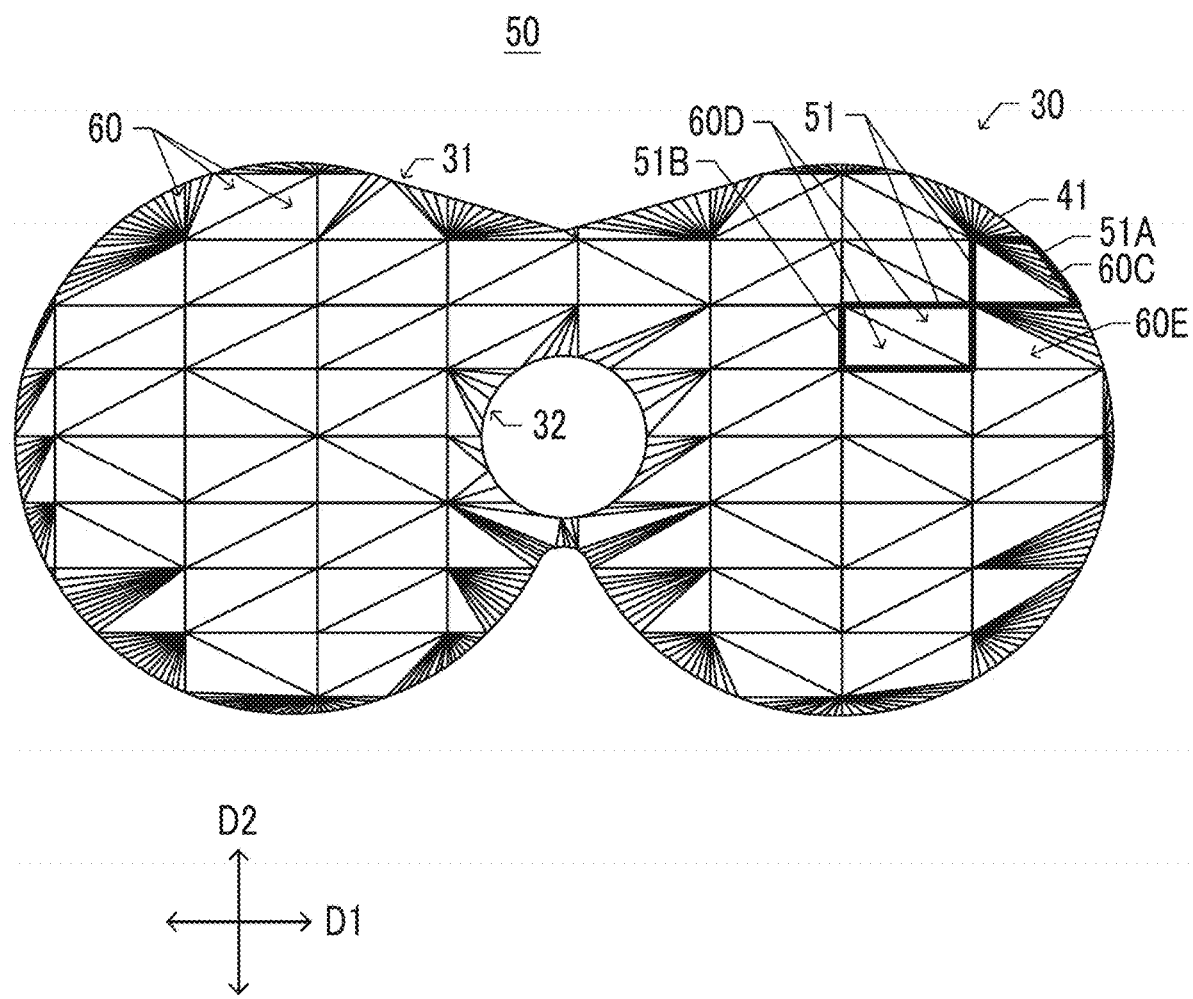
FIG. 11 is a diagram showing the two-dimensional planar figure in a state of being divided into a plurality of triangle elements.

FIG. 11 is a diagram showing the two-dimensional planar figure 30 in a state of being divided into a plurality of triangle elements 60. The inside of the two-dimensional planar figure 30 is segmented into a plurality of cells 51 by a plurality of straight lines parallel in the first direction D1 and a plurality of straight lines parallel in the second direction D2 perpendicular to the first direction D1. A plurality of triangle elements 60 are generated for each cell 51, and the triangle elements 60 are not disposed outside the two-dimensional planar figure 30. Inside the two-dimensional planar figure 30, a plurality of triangle elements 60 are generated without excess and deficiency.

In cells 51A where at least one of the outer border 31 and the inner border 32 of the two-dimensional planar figure 30 passes therethrough, a plurality of triangle elements 60C with the edges 41 as at least one side are generated. Cells 51B of which the entire region is included in the two-dimensional planar figure 30 are divided into two triangle elements 60D by one diagonal line. Even in the cells 51A where the borders 31 and 32 of the two-dimensional planar figure 30 pass therethrough, one triangle element 60E divided by a diagonal line of the cell 51 may be generated.

Next, excellent effects of the above-described embodiment will be described.

In the above-described embodiment, since the two-dimensional planar figure 30 is segmented into a plurality of cells 51 (Step S2), and each cell 51 is divided into the triangle elements 60 (Step S4), the number of feature points 40 to be focused at the time of generating the triangle elements 60 is reduced. In addition, it is possible to execute processing of dividing each cell 51 into the triangle elements 60 in parallel. With this, it is possible to reduce a time necessary for computation.

In the above-described embodiment, since the triangle elements 60 generated outside the two-dimensional planar figure 30 are removed (Step S5), even the two-dimensional planar figure 30 having the hole 33 (FIG. 3) inside can be divided into a plurality of triangle elements 60. For this reason, it can be said that the triangle element division method according to the above-described embodiment has high robustness.

An algorithm of the triangle element division method according to the above-described embodiment is simple. For this reason, an excellent effect that, in a case where a trouble occurs in a division result, search for a cause of the trouble is easily performed is obtained.

Next, a modification example of the above-described embodiment will be described. In the above-described embodiment, the virtual plane 50 (FIG. 5) is separated by two sets of straight line groups perpendicular to each other to be segmented into a plurality of cells 51. That is, the first direction D1 and the second direction D2 are perpendicular. For this reason, the cells 51 are squares or rectangles. As another method, the first direction D1 and the second direction D2 may cross obliquely. In this case, the cells 51 are parallelograms. The virtual plane 50 may be segmented such that the cells 51 are quadrangles other than parallelograms.

Next, a triangle element division method according to another embodiment will be described referring to FIGS. 12 to 16B. In the triangle element division method according to the embodiment shown in FIGS. 1 to 11, the single two-dimensional planar figure 30 (FIG. 3 and the like) is divided into the triangle elements 60 without excess and deficiency. In the following embodiment, the two-dimensional planar figure 30 constitutes one surface of a three-dimensional solid shape.

Figure 12:
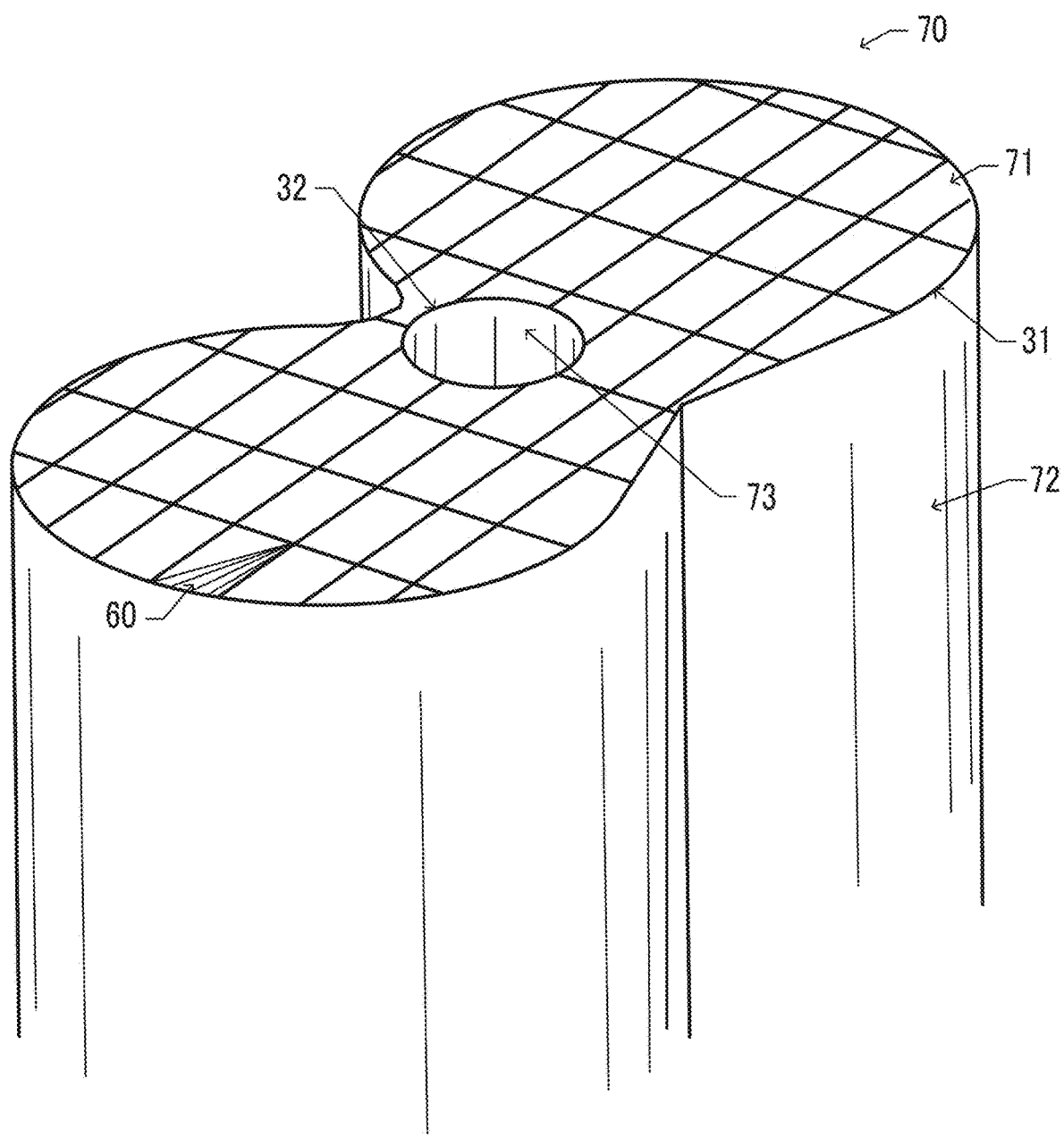
FIG. 12 is a perspective view of a portion of a three-dimensional solid shape.

FIG. 12 is a perspective view of a portion of a three-dimensional solid shape 70. A part (hereinafter, referred to as an upper surface 71) of a surface of the three-dimensional solid shape 70 has the same shape as the two-dimensional planar figure 30 (FIG. 3). That is, the upper surface 71 has an outer border 31 and an inner border 32 similarly to the two-dimensional planar figure 30. An outer side surface 72 and an inner side surface 73 of the three-dimensional solid shape 70 continue with the outer border 31 and the inner border 32 of the upper surface 71, respectively. In the embodiment, it is possible to achieve consistency between a plurality of triangle elements 60 generated on the upper surface 71 and a plurality of triangle elements generated on the outer side surface 72 and the inner side surface 72. Here, "achieve consistency" means that the triangle elements on one surface between two surfaces connected through the borders 31 and 32 and the triangle elements on the other surface are made to have a relationship corresponding to each other on a one-to-one basis through the edges.

First, the triangle element division method according to the embodiment shown in FIGS. 1 to 11 is applied to divide the upper surface 71 into a plurality of triangle elements 60 without excess and deficiency. In FIG. 12, only a part of triangle elements 60 is shown.

Figure 13:
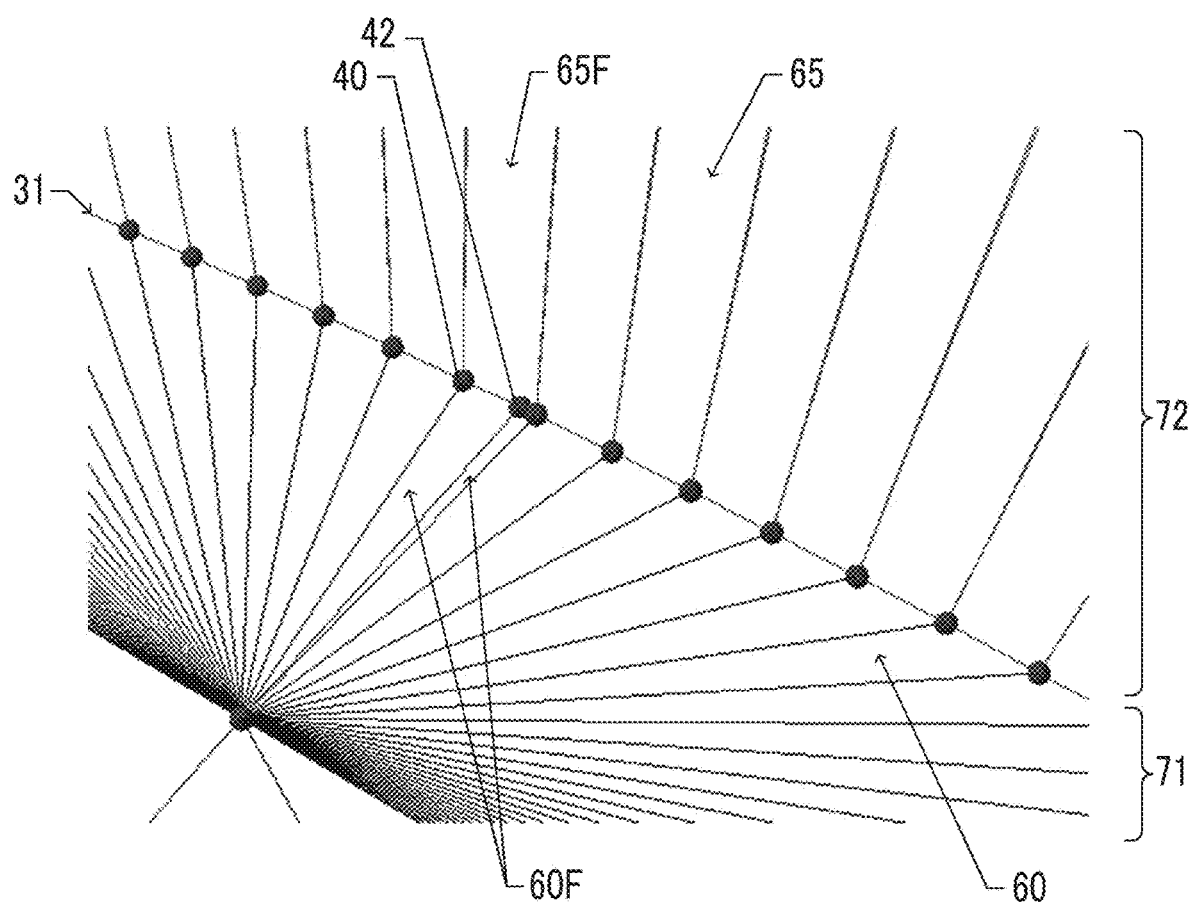
FIG. 13 is a diagram showing a plurality of triangle elements generated on a part of an outer border of an upper surface and an upper surface of the three-dimensional solid shape without excess and deficiency.

FIG. 13 shows a plurality of triangle elements 60 generated on a part of the outer border 31 of the upper surface 71 and the upper surface 71 without excess and deficiency. In addition, triangle elements 65 generated on the outer side surface 72 without excess and deficiency are shown. In dividing the upper surface 71 into a plurality of triangle elements 60, in a case where the method shown in FIGS. 1 to 11 is applied, an additional point 42 are disposed on the outer border 31 in addition to feature points 40. In the upper surface 71, two triangle elements 60F with the additional point 42 as a vertex are generated.

In a case where processing of dividing the outer side surface 72 into a plurality of triangle elements 65 is executed in parallel with processing of dividing the upper surface 71 into a plurality of triangle elements 60, in dividing the outer side surface 72 into a plurality of triangle elements 65, the additional point 42 is not disposed on the outer border 31. In a case where the outer side surface 72 is divided into a plurality of triangle elements 65 in this state, two triangle elements 60F with the additional point 42 as a vertex are generated on the upper surface 71 with respect to one triangle element 65F that is generated on the outer side surface 72. In this state, it cannot be said that consistency is achieved.

Next, a method of avoiding the generation of triangle elements having an inconsistent positional relationship, such as the two triangle elements 60F and the one triangle element 65F shown in FIG. 13, will be described referring to FIGS. 14A and 14B.

Figure 14A:
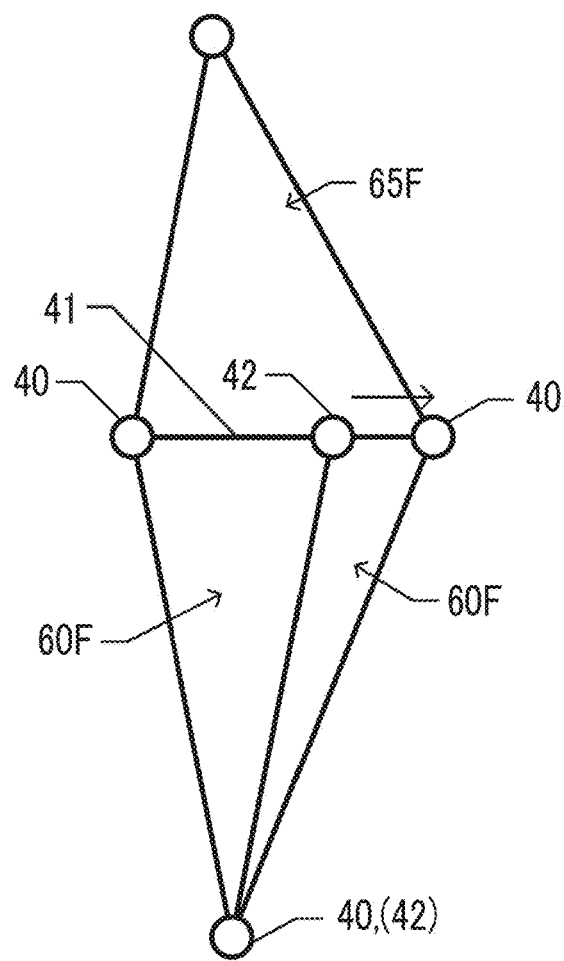
FIG. 14A is a diagram showing two triangle elements with one additional point 42 on an edge as a vertex and one triangle element with the edge as a side.

FIG. 14A is a diagram showing two triangle elements 60F with one additional point 42 on the edge 41 as a vertex and one triangle element 65F with the edge 41 as a side. Feature points 40 are disposed on both sides of the additional point 42 on the edge 41. Each of the triangle elements 60F has one additional point 42 on the edge 41 and one feature point 40 on the edge 41 as two vertices. The additional point 42 on the edge 41 is moved to a position of any one of the two feature points 40 on both sides thereof.

Figure 14B:
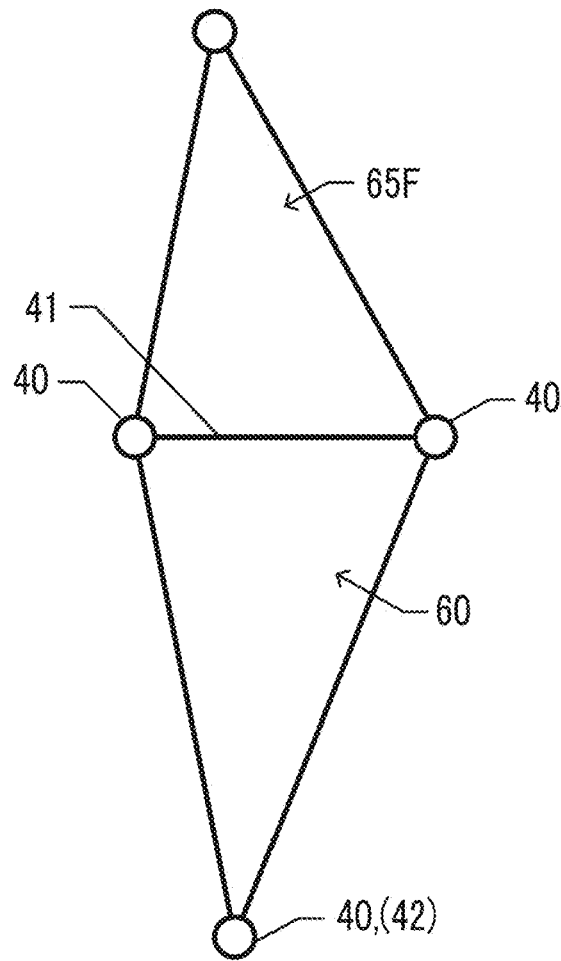
FIG. 14B is a diagram showing triangle elements in a state in which the additional point of the edge is moved to a position of any one of two feature points on both sides of the additional point.

FIG. 14B is a diagram showing triangle elements in a state in which the additional point 42 on the edge 41 is moved to the position of any one of the two feature points 40 on both sides thereof. With the movement, the additional point 42 disappears, and the shape of the triangle element 60F with the additional point 42 as a vertex changes. Specifically, one of the two triangle elements 60F disappears, and the other triangle element 60F becomes large. In this way, the additional point 42 on the edge 41 is moved to the position of one of the feature points 40 positioned at both ends of the edge 41, whereby it is possible to remove the additional point 42 on the edge 41.

In the example shown in FIGS. 14A and 14B, even though the additional point 42 is moved to the position of any feature point 40 on both sides thereof, the same effect is obtained. Incidentally, a result to be obtained may not satisfy a condition "the triangle elements are generated without excess and deficiency" depending on a direction of moving the additional point 42. Hereinafter, an example where the condition "the triangle elements are generated without excess and deficiency" is not satisfied will be described referring to FIGS. 15A and 16B.

Figure 15A:
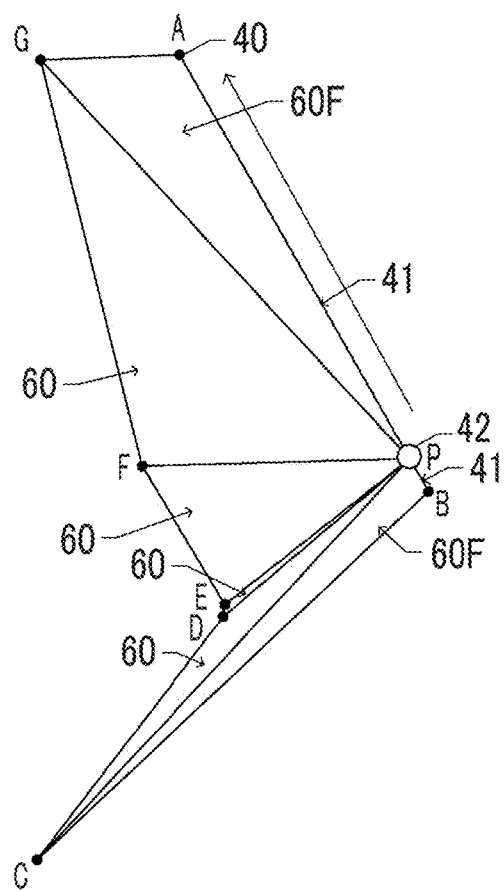
FIG. 15A is a diagram showing a plurality of triangle elements with an additional point P on an edge as a vertex.

FIG. 15A is a diagram showing a plurality of triangle elements 60 with an additional point 42 on the edge 41 as a vertex. The additional point 42 is denoted as P, feature points 40 on both sides of the additional point 42 are denoted as A and B, respectively, and five other feature points 40 that are connected to the additional point 42 by the sides of the triangle elements 60 are denoted as C, D, E, F, and G, respectively. Six triangle elements GAP, GPF, FPE, EPD, DPC, and CPB in total are generated.

Figure 15B:
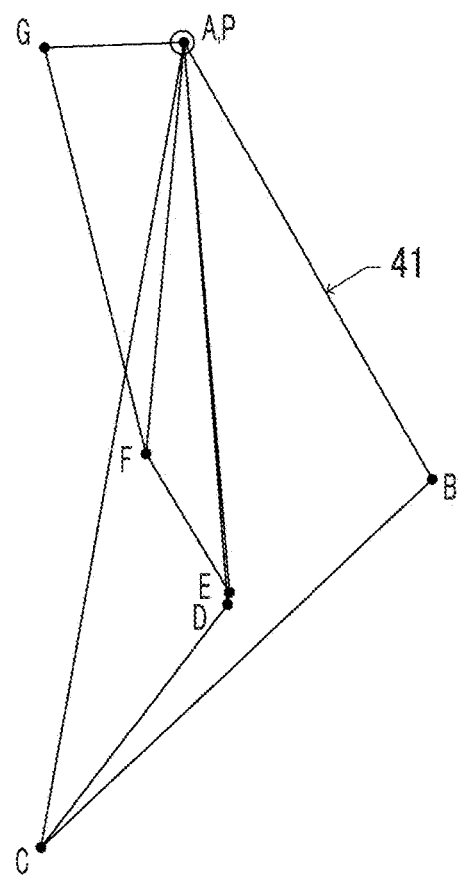
FIG. 15B is a diagram showing a plurality of triangle elements in a state in which the additional point P is moved to a position of a feature point A.

FIG. 15B is a diagram showing a plurality of triangle elements 60 in a state in which the additional point P is moved to a position of the feature point A. The original triangle element GAP disappears. In this state, the triangle element CPB overlaps other triangle elements GPF, FPE, EPD, and DPC. Accordingly, the condition "generation without excess and deficiency" is not satisfied. In this case, a sum of areas of the five triangle elements GPF, FPE, EPD, DPC, and CPB remaining after the additional point P is moved is greater than a sum of areas of the original six triangle elements GAP, GPF, FPE, EPD, DPC, and CPB.

Figure 16A:
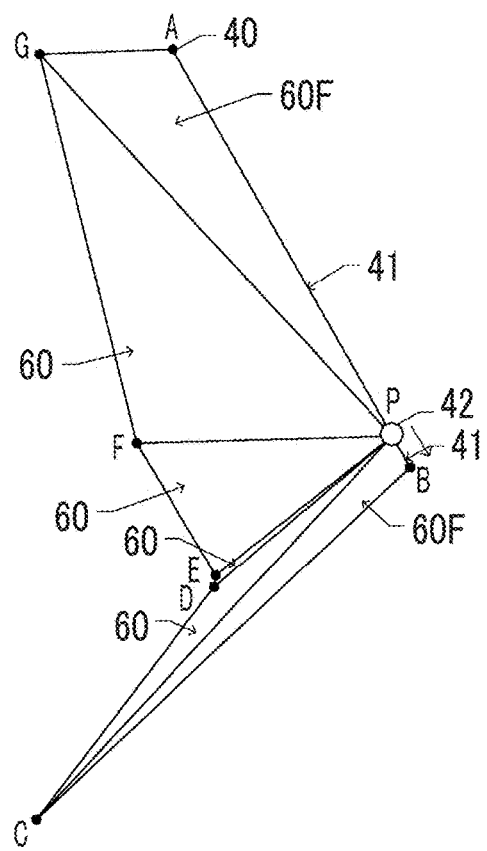
FIG. 16A is a diagram showing a plurality of triangle elements with the additional point P on the edge as a vertex.
Figure 16B:
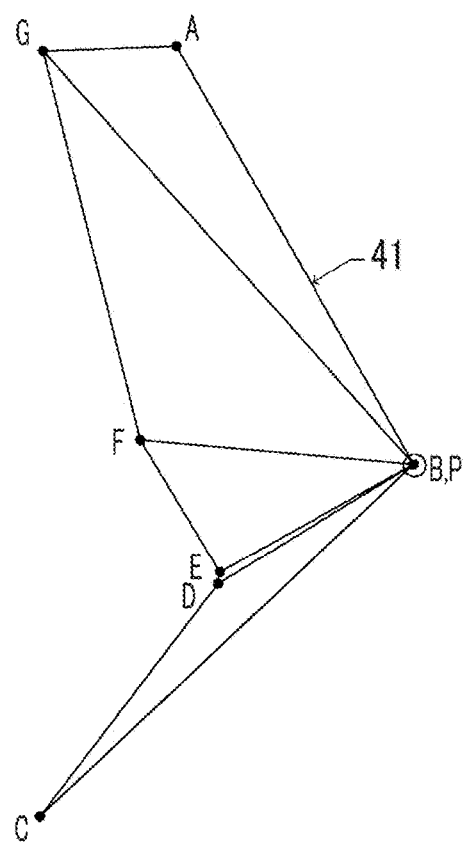
FIG. 16B is a diagram showing a plurality of triangle elements in a state in which the additional point P is moved to a position of a feature point B.

FIG. 16A is a diagram showing a plurality of triangle elements 60 in the same state as the state of FIG. 15A before the additional point P is moved. FIG. 16B is a diagram showing a plurality of triangle elements 60 in a state in which the additional point P is moved to the feature point B. In this case, the original triangle element CPB disappears, and the remaining five triangle elements GAP, GPF, FPE, EPD, and DPC remain. The remaining five triangle elements GAP, GPF, FPE, EPD, and DPC satisfy the condition "generation without excess and deficiency". In this case, a sum of areas of the five triangle elements GAP, GPF, FPE, EPD, and DPC remaining after the additional point P is moved is equal to the sum of the areas of the original six triangle elements GAP, GPF, FPE, EPD, DPC, and CPB.

After the additional point 42 on the edge 41 is moved to the position of any one of the feature points 40 at both ends of the edge 41, in a case where the sum of the areas of a plurality of triangle elements 60 with the additional point 42 as a vertex is greater than the sum of the areas of the triangle elements before the movement (FIG. 15B), determination can be made that the movement is inappropriate movement. In this case, as shown in FIG. 16B, the additional point 42 should be moved to the position of the opposite feature point 40 on the edge 41.

Next, excellent effects of the embodiment shown in FIGS. 12 to 16B will be described.

In the embodiment, after a portion, which is a plane, of the surface of the three-dimensional solid shape 70 (FIG. 12) is divided into a plurality of triangle elements 60, as shown in FIGS. 14B and 16B, the additional point 42 (FIG. 14A) is not disposed on the border 31 or 32 of the region divided into a plurality of triangle elements 60. For this reason, in a case where another surface region connected to a surface region divided into a plurality of triangle elements 60 through the border is divided into a plurality of triangle elements, it is possible to achieve consistency of arrangement of the triangle elements of the two surface regions connected through the border.

It should be understood that the above-described embodiments are examples and partial replacement or a combination of the configurations shown in different embodiments is possible. The same advantageous effect by the same configuration in a plurality of embodiments is not consecutively mentioned for each embodiment. In addition, the invention is not limited to the above-described embodiments. For example, it will be obvious to those skilled in the art that various alterations, improvements, combinations, and the like can be made.

It should be understood that the invention is not limited to the above-described embodiment, but may be modified into various forms on the basis of the spirit of the invention. Additionally, the modifications are included in the scope of the invention.

What is claimed is:

1. A modeling apparatus comprising:
a processor; and
an input unit electrically connected to the processor,
wherein the input unit is configured to:
acquire feature points that define a border of a virtual plane,
wherein the processor is configured to:
segment, when the processor acquires the feature points from the input unit, the virtual plane into cells,
position, when the processor segments the virtual plane into the cells, additional points at vertices of the cells and at where the cells cross the border of the virtual plane,
generate triangle elements, and
move the one of the additional points to the first one of the feature points or the second one of the feature points,
wherein vertices of the triangle elements are selected from the group consisting of the feature points and the additional points,
wherein a first line segment for a first one of the triangle elements extends from the first one of the feature points to the second one of the feature points through the one of the additional points,
wherein a second line segment for a second one of the triangle elements extends from the one of the additional points to the second one of the feature points, and
wherein a third line segment for a third one of the triangle elements extends from the first one of the feature points to the one of the additional points.

2. The modeling apparatus according to claim 1, wherein the input unit is a device selected from the group consisting of a keyboard, a touch panel, a pointing device, a removable medium reading device and a communication device.

3. The modeling apparatus according to claim 1, wherein the processor is configured to remove, when the processor generates the triangle elements, the triangle elements that are outside the virtual plane.

4. The modeling apparatus according to claim 3, wherein the processor is configured to output, to an output unit when the processor removes the triangle elements, data that defines the virtual plane.

5. The modeling apparatus according to claim 4, wherein the output unit is selected from the group consisting of a display, a removable medium writing device and a communication device.

6. A triangle element division method comprising:
acquiring, from an input unit, feature points that define a border of a virtual plane;

segmenting, by a processor when the processor acquires the feature points from the input unit, the virtual plane into cells;

positioning, by the processor when the processor segments the virtual plane into the cells, additional points at vertices of the cells and at where the cells cross the border of the virtual plane;

generating triangle elements; and moving the one of the additional points to the first one of the feature points or the second one of the feature points, wherein vertices of the triangle elements are selected from the group consisting of the feature points and the additional points, wherein a first line segment for a first one of the triangle elements extends from the first one of the feature points to the second one of the feature points through the one of the additional points, wherein a second line segment for a second one of the triangle elements extends from the one of the additional points to the second one of the feature points, and wherein a third line segment for a third one of the triangle elements extends from the first one of the feature points to the one of the additional points.

7. The triangle element division method according to claim 6, wherein the processor is electrically connected to the input unit.

8. The triangle element division method according to claim 6, further comprising:

removing, by the processor when the processor generates the triangle elements, the triangle elements that are outside the virtual plane.

9. The triangle element division method according to claim 8, further comprising:

outputting, to an output unit when the processor removes the triangle elements, data that defines the virtual plane.

10. A non-transitory data storage device having computer code embodied thereon, the computer code when executed by a processor causes a modeling apparatus to perform operations comprising:

acquiring, from an input unit, feature points that define a border of a virtual plane;

segmenting, by the processor when the processor acquires the feature points from the input unit, the virtual plane into cells;

positioning, by the processor when the processor segments the virtual plane into the cells, additional points at vertices of the cells and at where the cells cross the border of the virtual plane;

generating triangle elements; and moving the one of the additional points to the first one of the feature points or the second one of the feature points, wherein vertices of the triangle elements are selected from the group consisting of the feature points and the additional points, wherein a first line segment for a first one of the triangle elements extends from the first one of the feature points to the second one of the feature points through the one of the additional points, wherein a second line segment for a second one of the triangle elements extends from the one of the additional points to the second one of the feature points, and wherein a third line segment for a third one of the triangle elements extends from the first one of the feature points to the one of the additional points.

11. The non-transitory data storage device according to claim 10, wherein the processor is electrically connected to the input unit.

12. The non-transitory data storage device according to claim 10, wherein the computer code when executed by the processor causes the modeling apparatus to perform the operations further comprising:

removing, by the processor when the processor generates the triangle elements, the triangle elements that are outside the virtual plane.

13. The non-transitory data storage device according to claim 12, wherein the computer code when executed by the processor causes the modeling apparatus to perform the operations further comprising:

outputting, to an output unit when the processor removes the triangle elements, data that defines the virtual plane.

* * * * *